(12) United States Patent
Chen et al.

(10) Patent No.: US 12,107,935 B2
(45) Date of Patent: Oct. 1, 2024

(54) SYSTEM, METHOD AND COMPUTER-READABLE MEDIUM FOR NOTIFICATION

(71) Applicant: 17LIVE Japan Inc., Tokyo (JP)

(72) Inventors: Hong Dian Chen, Taipei (TW); Hsing Yu Tsai, Taipei (TW); Jui Li, Taipei (TW)

(73) Assignee: 17LIVE JAPAN INC., Tokyo (JP)

(*) Notice: Subject to any disclaimer, the term of this patent is extended or adjusted under 35 U.S.C. 154(b) by 0 days.

(21) Appl. No.: 17/977,304

(22) Filed: Oct. 31, 2022

(65) Prior Publication Data

US 2023/0353653 A1 Nov. 2, 2023

(30) Foreign Application Priority Data

Apr. 27, 2022 (JP) ................. 2022-073243

(51) Int. Cl.
G06F 15/16 (2006.01)
H04L 67/55 (2022.01)
H04L 65/61 (2022.01)

(52) U.S. Cl.
CPC .............. H04L 67/55 (2022.05); H04L 65/61 (2022.05)

(58) Field of Classification Search
CPC ................. H04L 67/55; H04L 65/61
See application file for complete search history.

(56) References Cited

U.S. PATENT DOCUMENTS

| | | | |
|---|---|---|---|
| 10,051,051 B2 * | 8/2018 | Ren ................. | H04L 65/611 |
| 10,747,400 B1 * | 8/2020 | Majumder ............ | G06F 16/248 |
| 10,834,219 B1 * | 11/2020 | Justin ................. | H04L 67/62 |
| 10,897,637 B1 * | 1/2021 | Pham ............... | H04N 21/23406 |
| 11,551,282 B2 * | 1/2023 | Medalion ............ | G06Q 30/0617 |
| 11,609,806 B2 * | 3/2023 | Feuz .................. | G06F 9/542 |
| 11,620,349 B1 * | 4/2023 | Xiong ................. | G06F 16/9536 |
| | | | 707/734 |
| 2012/0124604 A1 * | 5/2012 | Small ................. | H04N 21/4223 |
| | | | 725/12 |
| 2016/0165040 A1 * | 6/2016 | Queru ................. | B60K 35/00 |
| | | | 455/418 |

(Continued)

FOREIGN PATENT DOCUMENTS

JP 2020-0162979 A 10/2020

OTHER PUBLICATIONS

Notification of Reasons for Refusal dated Aug. 30, 2022, issued in corresponding Japanese Patent Application No. 2022-073243 (16 pgs.).

*Primary Examiner* — Oleg Survillo
(74) *Attorney, Agent, or Firm* — Pillsbury Winthrop Shaw Pittman, LLP

(57) ABSTRACT

The present disclosure relates to a system, a method and a computer-readable medium for notification of a live streaming program. The method includes obtaining a list of users related to the live streaming program, obtaining a first contribution score of a first user in the list of users, and transmitting a first notification request for notifying the first user about the live streaming program according to the first contribution score. The first contribution score is determined according to a behavior of the first user. The present disclosure can result in a more reliable notification, which may further improve the operation of a live streaming platform.

14 Claims, 13 Drawing Sheets

(56) References Cited

U.S. PATENT DOCUMENTS

| | | | |
|---|---|---|---|
| 2017/0195731 A1* | 7/2017 | Girlando | H04N 21/4312 |
| 2017/0236148 A1* | 8/2017 | James | G06F 16/335 |
| | | | 705/14.45 |
| 2018/0249222 A1* | 8/2018 | Bandela | H04N 21/25808 |
| 2018/0285986 A1* | 10/2018 | Perry | H04L 51/52 |
| 2018/0324133 A1* | 11/2018 | Costello | H04L 12/1822 |
| 2019/0130444 A1* | 5/2019 | Fei | G06F 16/437 |
| 2020/0221052 A1* | 7/2020 | Yoon | H04N 21/42204 |
| 2020/0233539 A1* | 7/2020 | Liu | G06F 16/906 |
| 2020/0329004 A1* | 10/2020 | Carbune | H04L 67/535 |
| 2021/0133007 A1* | 5/2021 | Ghosh | G06F 9/542 |
| 2021/0182697 A1* | 6/2021 | Singh | G06F 16/258 |
| 2021/0201175 A1* | 7/2021 | Ou | G06N 20/00 |
| 2022/0014820 A1* | 1/2022 | Hannes | H04N 21/44224 |
| 2022/0203228 A1* | 6/2022 | Wiggeshoff | A63F 13/86 |
| 2022/0303605 A1* | 9/2022 | Zhang | H04N 21/6587 |
| 2022/0312071 A1* | 9/2022 | Devaraj | H04N 21/44218 |
| 2022/0383350 A1* | 12/2022 | Keshavan | H04N 21/25891 |
| 2023/0141428 A1* | 5/2023 | Jacobson | H04W 12/02 |
| | | | 713/168 |

\* cited by examiner

| Viewer ID | IP address | Corresponding notification server |
|---|---|---|
| V1 | 216.58.216.64 | NS1 |
| V2 | ⋮ | ⋮ |
| ⋮ | ⋮ | |

| Viewer ID | Contribution scores |
|---|---|
| V1 | 70 |
| V2 | 80 |
| ... | ... |

| Priority level | Contribution Scores of the related viewers | Related viewers |
|---|---|---|
| 1 (Highest priority) | Top N score (s) | V1, V3, V9, ... (N viewers) |
| 2 | N+1 ~ 2N | V2, V4, V5, ... (N viewers) |
| 3 | 2N+1 ~ 3N | ... |
| 4 | 3N+1 ~ 4N | ... |
| ... | ... | ... |

| Priority Level | viewer contribution level 1 (highest) | viewer contribution level 2 | viewer contribution level 3 | viewer contribution level 4 (low) |
| --- | --- | --- | --- | --- |
| streamer A (high contribution) | 1 (Highest) (Va, Vc, Vd) | 3 (Vb, Ve) | 4 (Vf) | 6 (Vg) |
| streamer B (middle contribution) | 2 (Vh, Vi) | 5 (Vj, Vm) | 8 (Vk, Vl) | 10 |
| streamer C (low contribution) | 7 | 9 | 11 | 12 | priority through out viewers of streamers A, B and C

FIG. 10

| Priority Level | viewer contribution level 1 (highest) | viewer contribution level 2 | viewer contribution level 3 | viewer contribution level 4 (low) |
|---|---|---|---|---|
| streamer A (high contribution) | 1 (Highest) (Va, Vc, Vd) | 2 (Vb, Ve) | 3 (Vf) | 4 (Vg) |
| streamer B (middle contribution) | 5 (Vh, Vi) | 6 (Vj, Vm) | 7 (Vk, Vl) | 8 |
| streamer C (low contribution) | 9 | 10 | 11 | 12 | priority through out viewers of streamers A, B and C

FIG. 11

| Parameter of backend server | Threshold value |
|---|---|
| CPU usage rate | 70% |
| Memory usage rate | 75% |
| Bandwidth usage rate | 80% |
| QPS | 10K |

SYSTEM, METHOD AND COMPUTER-READABLE MEDIUM FOR NOTIFICATION

CROSS-REFERENCE TO RELATED APPLICATIONS

This application is based on and claims the benefit of priority from Japanese Patent Application Serial No. 2022-073243 (filed on Apr. 27, 2022), the contents of which are hereby incorporated by reference in its entirety.

TECHNICAL FIELD

The present disclosure relates to notification of streaming data and, more particularly, to notification of live streaming data.

BACKGROUND

Realtime data sharing on the Internet has become popular in our daily life. There are various platforms or providers providing the service of live streaming programs, and the competition is fierce. One critical feature of a content provider is the notification push service, which is configured to notify a user about a newly started live streaming program.

SUMMARY

A method according to one embodiment of the present disclosure is a method for notification of a live streaming program being executed by one or a plurality of computers, and includes: obtaining a list of users related to the live streaming program, obtaining a first contribution score of a first user in the list of users, and transmitting a first notification request for notifying the first user about the live streaming program according to the first contribution score. The first contribution score is determined according to a behavior of the first user.

A system according to one embodiment of the present disclosure is a system for notification of a live streaming program that includes one or a plurality of computer processors, and the one or plurality of computer processors execute a machine-readable instruction to perform: obtaining a list of users related to the live streaming program, obtaining a first contribution score of a first user in the list of users, and transmitting a first notification request for notifying the first user about the live streaming program according to the first contribution score. The first contribution score is determined according to a behavior of the first user.

A computer-readable medium according to one embodiment of the present disclosure is a non-transitory computer-readable medium including a program for notification of a live streaming program, and the program causes one or a plurality of computers to execute: obtaining a list of users related to the live streaming program, obtaining a first contribution score of a first user in the list of users, and transmitting a first notification request for notifying the first user about the live streaming program according to the first contribution score. The first contribution score is determined according to a behavior of the first user.

BRIEF DESCRIPTION OF THE DRAWINGS

FIG. 7 shows an exemplary data structure of the viewer table 304 in FIG. 4.

FIG. 8 shows an exemplary data structure of the contribution table 306 in FIG. 4.

FIG. 9 shows an exemplary data structure of the priority table 308 in FIG. 4.

FIG. 10 shows an exemplary data structure of a priority table in accordance with some embodiments of the present disclosure.

FIG. 11 shows an exemplary data structure of a priority table in accordance with some embodiments of the present disclosure.

FIG. 13 shows an exemplary data structure of the parameter threshold table 310 in FIG. 4.

DETAILED DESCRIPTION

Notification service has to be done in a timely and precise manner, such that the right audience can be informed of the right contents right in the beginning of the content. Specifically, for a live streaming provider, the "right audience" usually means those who contribute to a larger portion of the revenue for the live streaming service. It is important to make sure those "high priority" users can get the timely notification about their interested contents, and to keep them on the platform as long as possible. It is important to prevent the users from missing any content they are interested in.

Conventional methods or systems for notification push face some challenges that need to be addressed. One challenge is the lack of priority determination regarding the notification process. When there are a lot of users that need to be notified (such as, when a live streaming program distributed by a streamer having a lot of followers is started), it could take much time to complete the notification for each of the users. The time difference or the delay between the start of a live streaming program and the completion of all notifications could take as long as 5 to 20 mins. The delay may be due to various reasons such as the processing ability of a backend server supporting the live streaming program, the processing ability of a notification server for the notification processes, or the internet connection condition. Therefore, when there is no priority regarding the notification process, a user who has potential of higher revenue contribution may get the notification much later than a user who has little potential of revenue contribution. That may cause the user with potential of high revenue contribution to have a negative experience, and may adversely affect the operation of the live streaming service.

Another challenge is that, besides the delay in the notification process, some notifications may just fail and some users cannot get the notifications at all. The failure in the notification could happen when too many notification requests need to be transmitted to a notification server at once or within a short time period, which could cause the notification server (sometimes even the backend server) to be overburdened. If the notification fails to reach the users with potential of high revenue contribution, the revenue of the live streaming provider could be greatly impacted.

Figure 1:
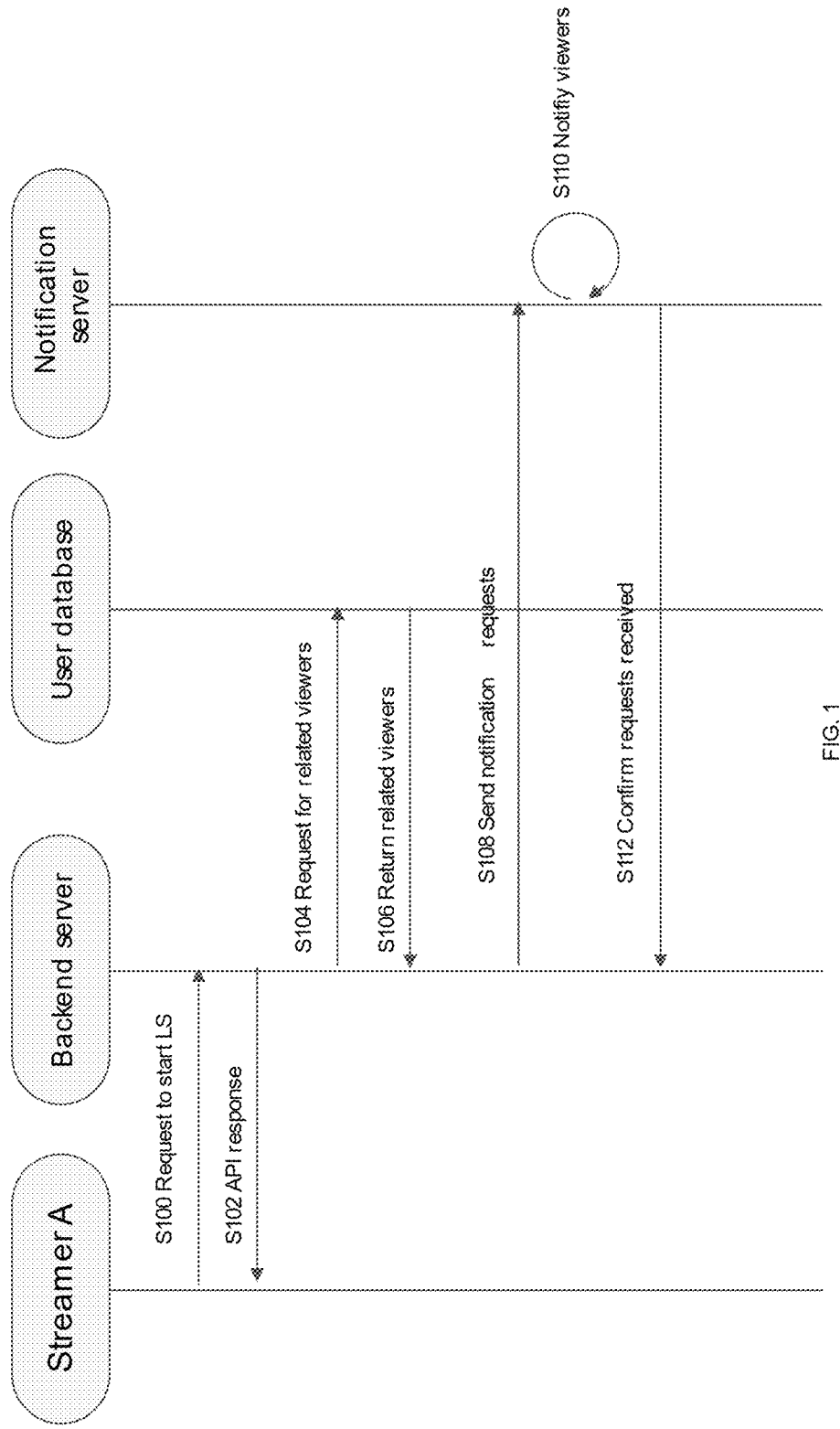
FIG. 1 shows an exemplary sequence chart illustrating a conventional notification process for a live streaming service.

FIG. 1 shows an exemplary sequence chart illustrating a conventional notification process for a live streaming service.

In step S100, streamer A transmits a request to a backend server to start a live streaming (LS) program.

In step S102, the backend server transmits an API response to confirm the receipt of the live streaming request.

In step S104, the backend server transmits a request for related viewers to a user database. Here the related viewers are usually followers of streamer A, that is, the users that need to be notified of the streaming program distributed by streamer A.

In step S106, the user database transmits information of the related viewers to the backend server.

In step S108, the backend server transmits notification requests to a notification server. The notification requests contain information for all the related viewers that need to be notified about the live streaming program.

In step S110, the notification server notifies the related viewers about the live streaming program according to the information received in step S108. The notification server is usually separated from the backend server providing the live streaming service. The notification server is configured to execute the notification processes for the live streaming service.

In step S112, the notification server transmits confirmation of receiving the notification requests to the backend server.

Conventionally, when streamer A is a popular streamer and has many followers, delay or crash could happen in step S108 and/or step S110. For example, the processing loading for the backend server to generate and send out the notification requests may be too high such that a severe delay or system failure happens in step S108 at the user database. For example, the processing loading for the notification server to receive and process the notification requests may be too high such that a severe delay or system failure happens in step S110 at the notification server. Either case can result in severe delay of notification or notification failure for some of the viewers.

Figure 2:
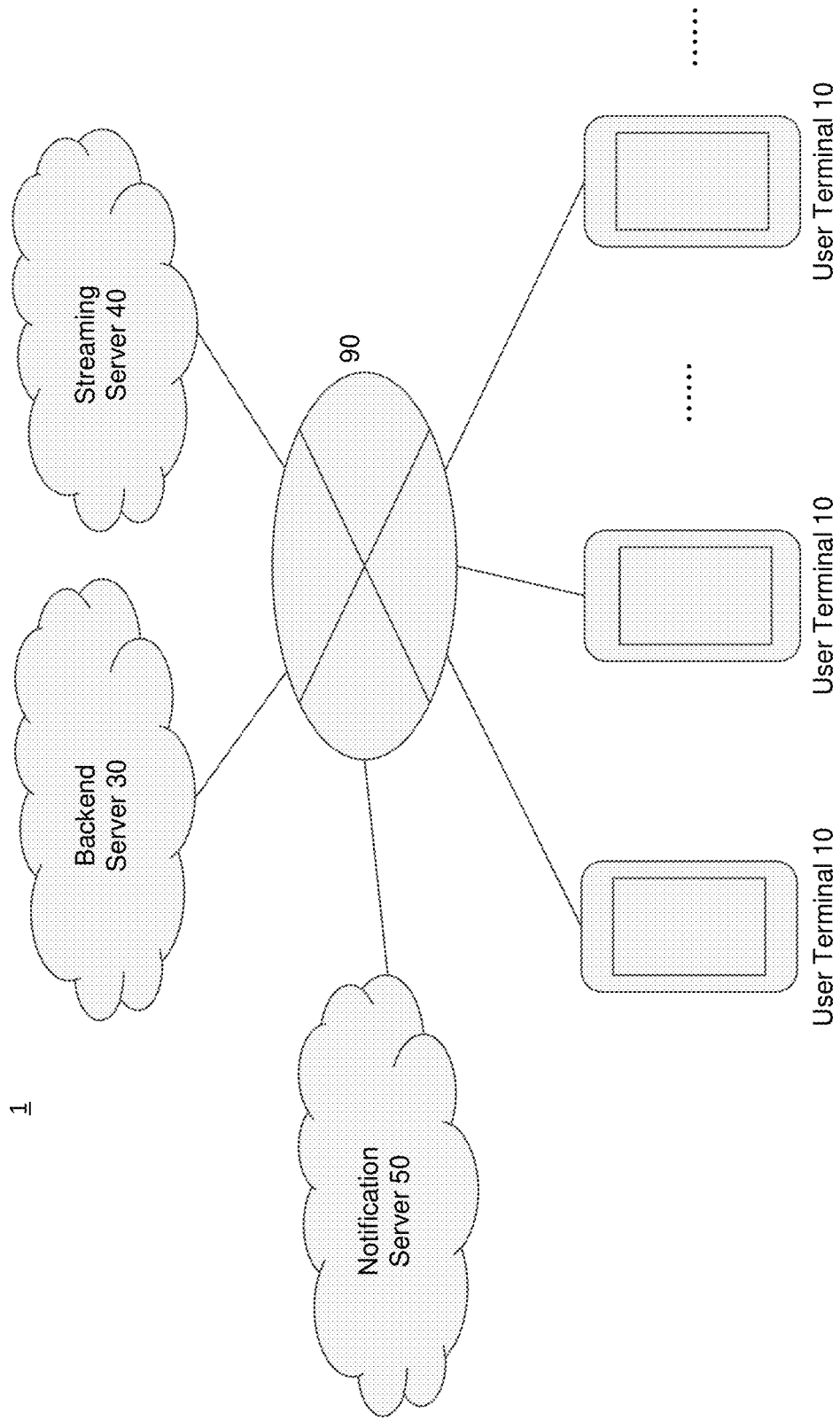
FIG. 2 shows a schematic configuration of a communication system according to some embodiments of the present disclosure.

FIG. 2 shows a schematic configuration of a communication system according to some embodiments of the present disclosure.

The communication system 1 may provide a live streaming service with interaction via a content. Here, the term "content" refers to a digital content that can be played on a computer device. In other words, the communication system 1 enables a user to participate in real-time interaction with other users on-line. The communication system 1 includes a plurality of user terminals 10, a backend server 30, a streaming server 40, and a notification server 50. The user terminals 10, the backend server 30, the streaming server 40 and the notification server 50 are connected via a network 90, which may be the Internet, for example. The backend server 30 may be a server for synchronizing interaction between the user terminals and/or the streaming server 40. In some embodiments, the backend server 30 may be referred to as the server of an application (APP) provider. The streaming server 40 is a server for handling or providing streaming data or video data. In some embodiments, the backend server 30 and the streaming server 40 may be independent servers. In some embodiments, the backend server 30 and the streaming server 40 may be integrated into one server. In some embodiments, the user terminals 10 are client devices for the live streaming service. In some embodiments, the user terminal 10 may be referred to as viewer, streamer, anchor, podcaster, audience, listener or the like. Each of the user terminal 10, the backend server 30, the streaming server 40 and the notification server 50 is an example of an information-processing device. In some embodiments, the streaming may be live streaming or video replay. In some embodiments, the streaming may be audio streaming and/or video streaming. In some embodiments, the streaming may include contents such as online shopping, talk shows, talent shows, entertainment events, sports events, music videos, movies, comedy, concerts or the like.

Figure 3:
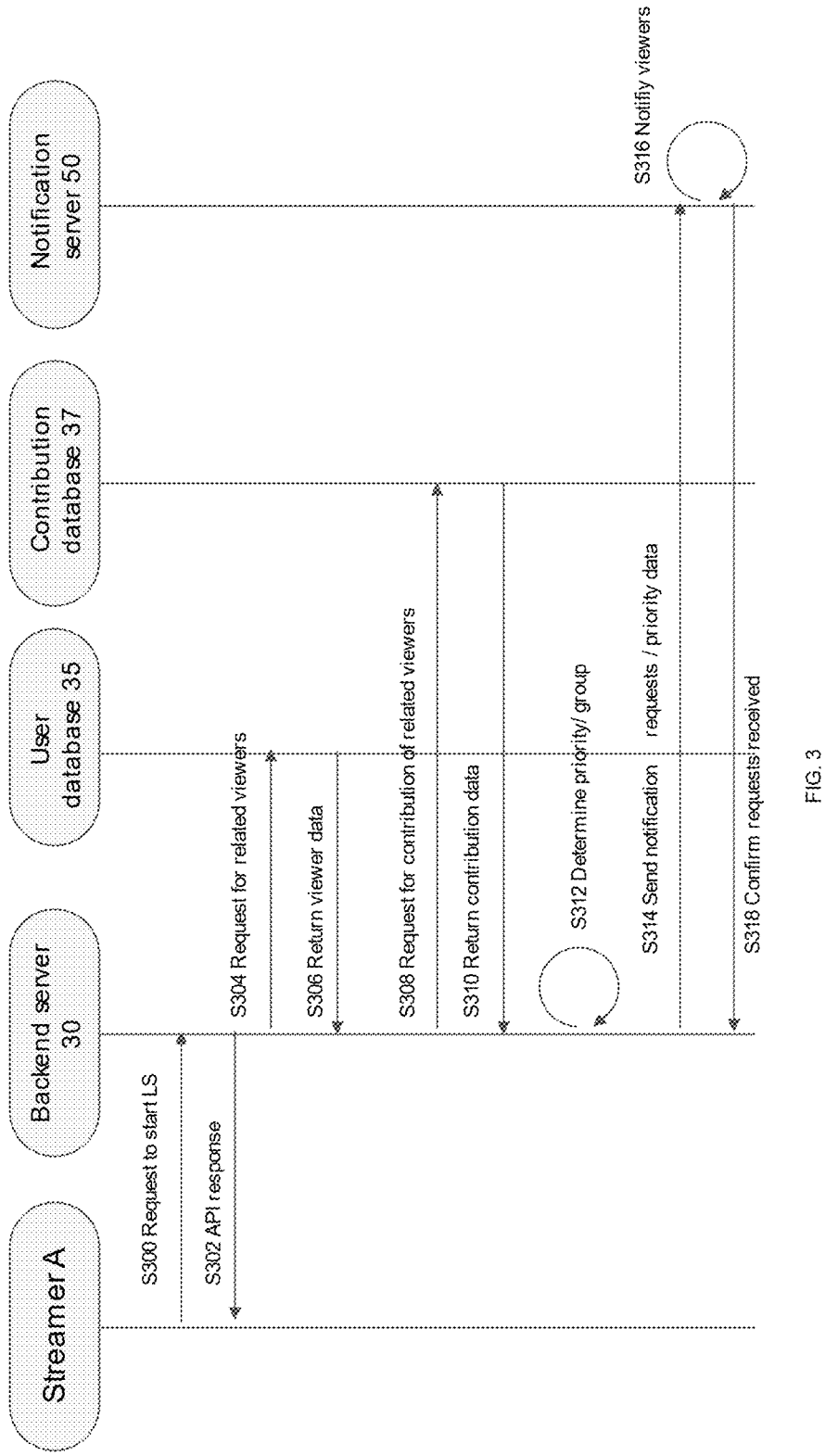
FIG. 3 shows an exemplary sequence chart illustrating a notification process for a live streaming service according to some embodiments of the present disclosure.

FIG. 3 shows an exemplary sequence chart illustrating a notification process for a live streaming service according to some embodiments of the present disclosure.

In step S300, streamer A (or the user terminal of streamer A) transmits a request for starting a live streaming program to the backend server 30.

In step S302, the backend server 30 transmits an API response to confirm the receipt of the live streaming request. In some embodiments, the API response may include metadata related to the live streaming program.

In step S304, the backend server 30 transmits a request for related viewers to the user database 35. The related viewers are users that are determined to be eligible for receiving the notification about the live streaming program. In some embodiments, the related viewers include followers of streamer A. In some embodiments, the related viewers include viewers that share the same or similar attributes/tags as streamer A or the live streaming program.

In step S306, the user database 35 transmits information of the related viewers to the backend server 30. In some embodiments, a machine learning model, implemented within or outside the user database 35, is utilized to determine the eligible viewers based on attributes of accessible users and attributes of streamer A (or tags of the live streaming program).

In step 308, the backend server 30 transmits a request for contribution scores of the related viewers to a contribution database 37. The contribution database 37 is configured to store contribution scores of all available users or viewers. In some embodiments, the contribution scores are calculated by a contribution determining unit implemented within or outside the contribution database 37. A viewer's contribution score may be determined according to the viewer's behavior (or behavior history) on the live streaming platform. Calculations of the contribution scores will be explained in detail later.

In step S310, the contribution database 37 transmits the contribution scores of the related viewers to the backend server 30.

In step S312, the backend server 30 determines a priority level (or notification priority level) for each of the related viewers according to the viewer's contribution score. In some embodiments, a viewer with a higher contribution score is determined to have a higher priority level. In some embodiments, the backend server 30 generates priority data (or a priority table) including the information of the priority levels of the related viewers. For example, in the case that the backend server 30 determines the contribution score of viewer A to be higher than the contribution score of viewer B, the backend server 30 determines the priority level of viewer A to be higher than the priority level of viewer B.

In step S314, the backend server 30 transmits notification requests to a notification server 50. The notification requests contain information for all the related viewers that need to be notified about the live streaming program.

In some embodiments, the notification requests are transmitted in an order corresponding to the priority levels of the related viewers. For example, when viewer A has a higher priority than viewer B, the notification request for notifying viewer A may be transmitted earlier than the notification request for notifying viewer B. The priority-based transmission can protect the backend server 30 from being overburdened by sending too many notification requests at once or within a very short time period, which may lead to severe notification delay or notification failure. The priority-based transmission can protect the notification server 50 from being overburdened by receiving too many notification requests at once or within a very short time period, which may lead to severe notification delay or notification failure.

In some embodiments, the priority data is transmitted along with the notification requests (or is included within the notification requests) from the backend server 30 to the notification server 50.

In some embodiments, one notification request may correspond to one viewer. In some embodiments, one notification request may correspond to more than one viewer. In some embodiments, the priority data is included in one or more notification requests.

In some embodiments, a notification request for a viewer with a higher contribution score is transmitted with a higher priority than a notification request for a viewer with a lower contribution score. For example, the notification request with a higher priority may be transmitted through a more stable internet channel. In some embodiments, notification requests with different priorities may be transmitted to different notification servers. For example, the notification request with a higher priority may be transmitted to a notification server with a higher specification and more reliable performance.

In step S316, the notification server 50 notifies the related viewers about the live streaming program according to the information received in step S314. The notification server 50 notifies the related viewers about the live streaming program in an order corresponding to the priority levels of the related viewers.

In some embodiments, a notification request for a higher priority viewer is received at the notification server 50 earlier than a notification request for a lower priority viewer, the notification server 50 then notifies the higher priority viewer about the live streaming program earlier than the lower priority viewer.

In some embodiments, the notification server 50 determines the notification order based on the priority data received in step S314. For example, a higher priority viewer would be notified earlier than a lower priority viewer about the live streaming program.

The priority-based notification can make sure that high priority viewers (or high contribution viewers) get the notification in time. The priority-based notification can protect the notification server 50 from being overburdened by notifying too many viewers at once or within a very short time period.

In step S318, the notification server 50 transmits confirmation of receiving the notification requests to the backend server 30. Step S318 may occur before, after, or concurrently with step S316. In some embodiments, the notification server 50 transmits confirmation of completing the notification tasks to the backend server 30 after step S316 is done.

Figure 4:
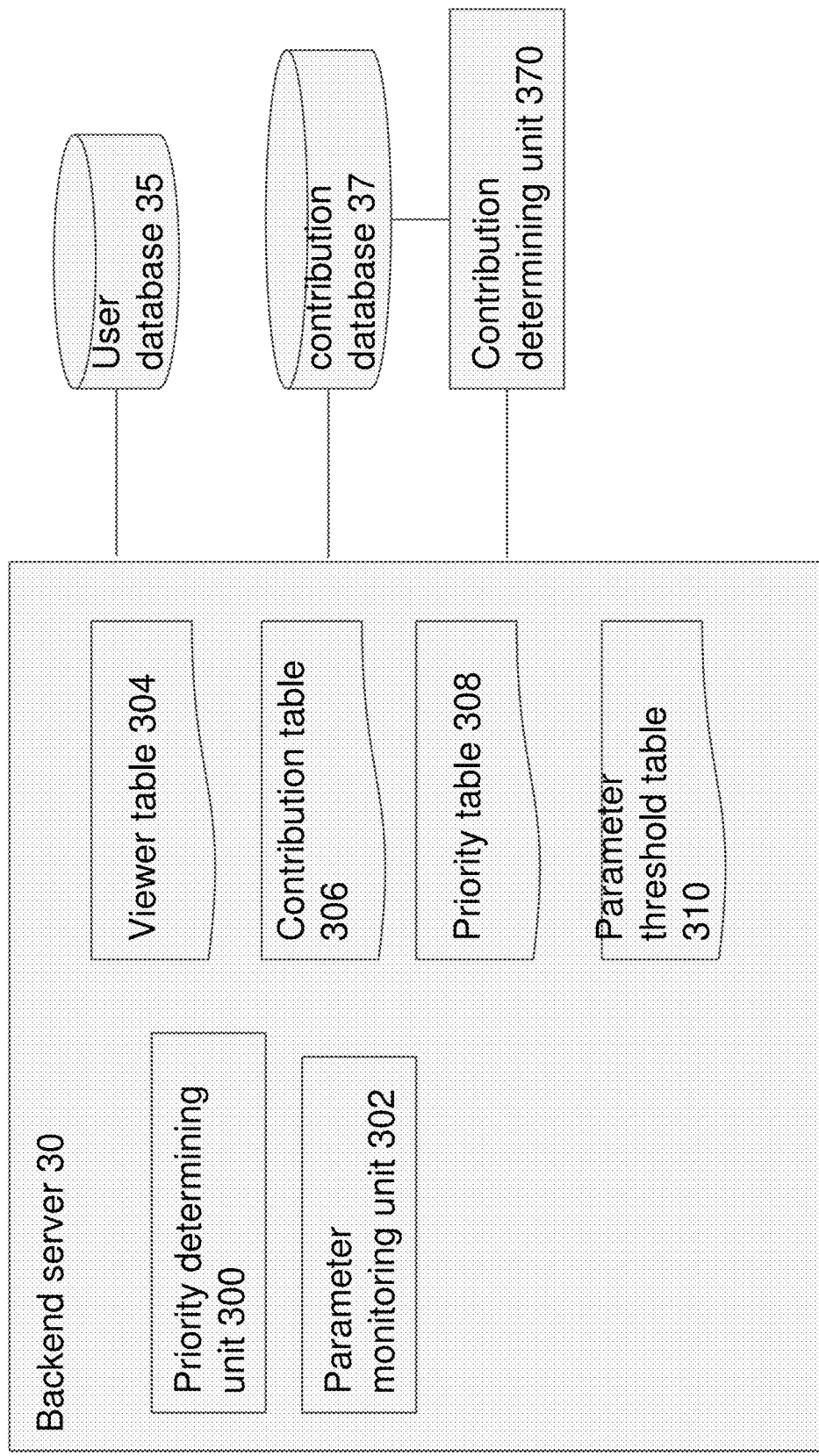
FIG. 4 shows a schematic configuration of a communication system according to some embodiments of the present disclosure.

FIG. 4 shows a schematic configuration of a communication system according to some embodiments of the present disclosure. As shown in FIG. 4, a backend server 30 includes a priority determining unit 300, a parameter monitoring unit 302, a viewer table 304, a contribution table 306, a priority table 308 and a parameter threshold table 310. The user database 35, the contribution database 37 and the contribution determining unit 370 are implemented outside the backend server 30.

The priority determining unit 300 is configured to determine a priority level (or notification priority level) for each of the related viewers according to the viewer's contribution score. The priority determining unit 300 refers to the contribution table 306 for the contribution scores of the related viewers, and determine the priority levels accordingly. In some embodiments, one or more of the processes described for step S312 in FIG. 3 are executed by the priority determining unit 300.

The parameter monitoring unit 302 is configured to monitor one or more parameters of the backend server 30. The monitored parameters may include the cpu usage rate, the memory usage rate, the bandwidth and/or the QPS (queries per second) data of the backend server 30.

In some embodiments, the backend server 30 may include another parameter monitor unit configured to monitor one or more parameters of a notification server outside the backend server 30. The monitored parameters may include the cpu usage rate, the memory usage rate, the bandwidth and/or the QPS (queries per second) data of the notification server. Applications of the monitored parameters will be described later.

The viewer table 304 is configured to store viewer data. For example, information of the related viewers received from the user database 35 may be stored in the viewer table 304.

The contribution table 306 is configured to store contribution data or contribution scores of the viewers. For example, contribution scores of the related viewers received from the contribution database 37 may be stored in the contribution table 306.

The priority table 308 is configured to store the priority data determined by the priority determining unit 300.

The parameter threshold table 310 is configured to store threshold values for parameters monitored by the parameter monitoring unit 302.

The user database 35 is configured to store information of all available users. The information includes identity information needed for a notification process. The users may include streamers and/or viewers on the live streaming platform. The user database 35 may be part of a cloud service responsible for monitoring and storing user information for live streaming providers. In some embodiments, a user database can be implemented within a backend server.

The contribution database 37 is configured to store contribution data or contribution scores of users. The contribution scores are calculated or determined by the contribution determining unit 370 based on the behaviors of the users. The contribution scores may be constantly or periodically updated by the contribution determining unit 370.

The contribution determining unit 370 may determine the contribution score of a user based on the user's behaviors such as commenting behavior, gift sending behavior, purchasing behavior, viewing behavior, logging-in behavior, or interacting behavior on the live streaming platform. The contribution score may increase as the commenting amounts or commenting frequency increases. The contribution score may increase as the gift sending amounts or gift sending frequency increases. The contribution score may increase as the purchasing amounts or purchasing frequency increases. The contribution score may increase as the viewing duration or viewing frequency increases. The contribution score may increase as the logging-in times or logging-in frequency increases. The contribution score may increase if the user is determined to have positive interaction with other users. The positive interaction may include inviting other users to a live streaming program, encouraging other users to stay longer on a live streaming program or helping a streamer get more gifts from other users. The contribution score may decrease if the user is determined to have negative interaction with other users. The negative interaction may include bullying or impolite comments toward other users (including streamers or viewers), or any behavior that is determined to have a negative impact on the revenue of the live streaming platform.

In some embodiments, the contribution database and/or the contribution determining unit may be implemented within the backend server.

Figure 5:
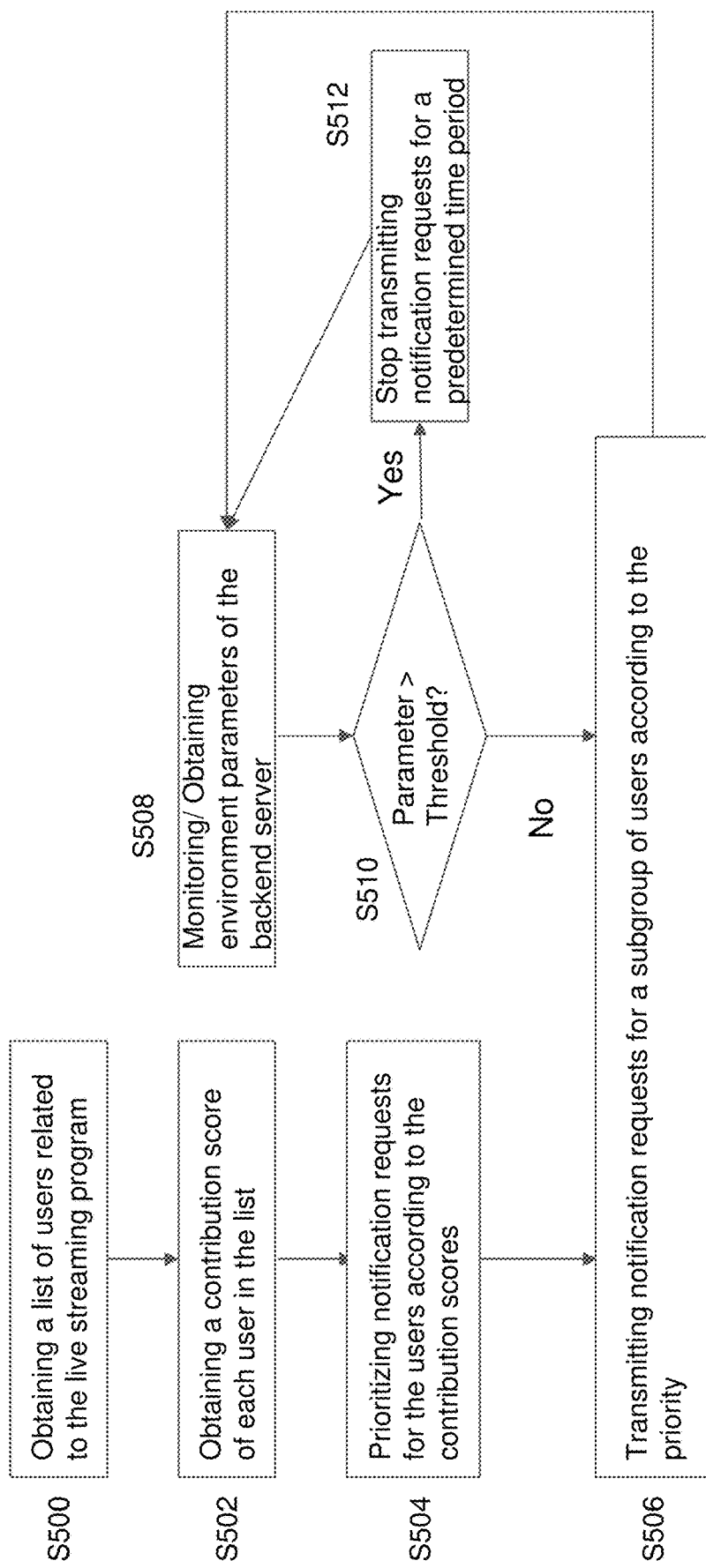
FIG. 5 shows an exemplary flow chart for notification according to some embodiments of the present disclosure.

FIG. 5 shows an exemplary flow chart for notification according to some embodiments of the present disclosure.

In step S500, a list of users or viewers related to the live streaming program is obtained. The process could be performed by the backend server 30. The information of the related viewers may be stored in the viewer table 304.

In step S502, the contribution score of each user in the list is obtained. For example, the contribution score of each user in the list is obtained by the backend server 30 from the contribution database 37. The contribution scores may be stored in the contribution table 306.

In step S504, notification requests for the related users are prioritized according to their contribution scores. The process could be performed by the priority determining unit 300. The determined priority data may be stored in the priority table 308.

In step S506, notification requests for a subgroup of users are transmitted. For example, notification requests for a subgroup of viewers with the highest priority level are transmitted from the backend server 30 to the notification server 50 for the notification processes.

In step S508, environment parameters of the backend server 30 are monitored or obtained. The process could be performed by the parameter monitoring unit 302. The monitored parameters may include the cpu usage rate, the memory usage rate, the bandwidth and/or the QPS (queries per second) data of the backend server 30.

In step S510, the monitored parameters were compared with their threshold values. The comparison process may be performed by the parameter monitoring unit 302 or another comparison unit within the backend server 30. The threshold values may be stored in the parameter threshold table 310.

The threshold values may be determined by system operators of the live streaming platform. The threshold value for each parameter may be determined such that a parameter found to be higher than its threshold value indicates an overburdened status of the backend server 30. The overburdened status of the backend server 30 may lead to severe notification delay or notification failure. For example, through history data analysis, it is observed that severe notification delay or notification failure tend to happen when the cpu usage rate of the backend server 30 is higher than 70%. Or, high correlation is found to exist between [severe notification delay or notification failure] and [cpu usage rate>70%]. Then the threshold value of the cpu usage rate may be determined to be 70% or lower.

If all parameters are found to be less than or equal to their corresponding threshold values, the flow goes to step S506. In that case, it is determined that the backend server 30 is not overburdened and has capacity for further processes, and notification requests for a subgroup of viewers with the second (or next) highest priority level are transmitted from the backend server 30 to the notification server 50 for subsequent notification processes.

If one or more parameters are found to be higher than their corresponding threshold values, the flow goes to step S512.

In step S512, the backend server 30 stops (or halts) transmitting notification requests to the notification server 50 for a predetermined time period. After the halt, the flow goes to step S508 for subsequent parameter monitoring. In some embodiments, the halt may let the monitored parameters drop below the threshold values. That is, the halt may help alleviate the burden of the backend server 30, and let the backend server 30 return to a healthy status that is not overburdened.

Figure 6:
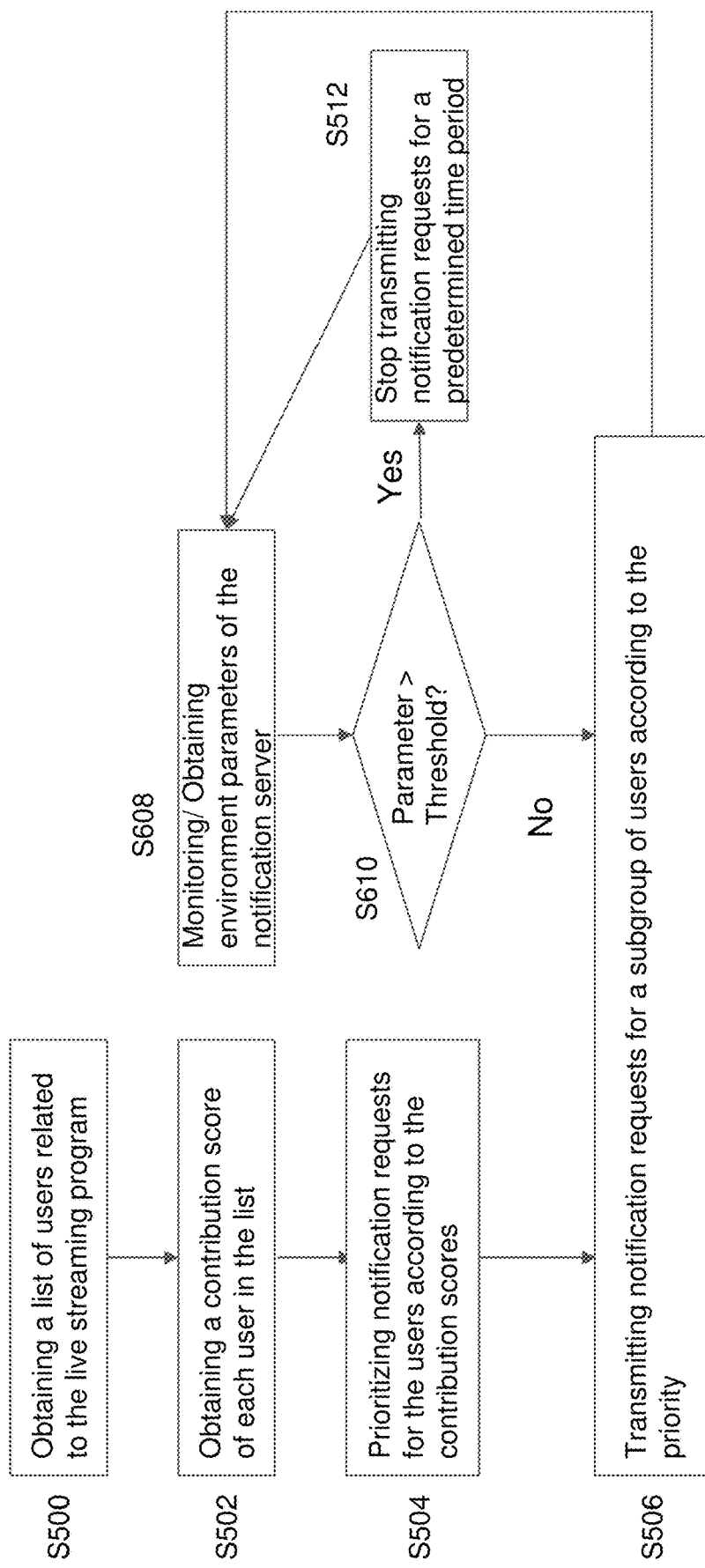
FIG. 6 shows an exemplary flow chart for notification according to some embodiments of the present disclosure.

FIG. 6 shows an exemplary flow chart for notification according to some embodiments of the present disclosure. The flow in FIG. 6 is similar to the flow in FIG. 5, and only differs in step S608 and step S610.

In step S608, environment parameters of the notification server 50 are monitored or obtained. The process could be performed by a parameter monitoring unit within the backend server 30. The monitored parameters may include the cpu usage rate, the memory usage rate, the bandwidth and/or the QPS (queries per second) data of the notification server 50.

In step S610, the monitored parameters (of the notification server 50) were compared with their threshold values. The comparison process may be performed by the parameter monitoring unit or another comparison unit within the backend server 30. The threshold values may be stored in the parameter threshold table 310.

The threshold values may be determined by system operators of the live streaming platform or by system operators of the notification server 50. The threshold value for each parameter may be determined such that a parameter found to be higher than its threshold value indicates an overburdened status of the notification server 50. The overburdened status of the notification server 50 may lead to severe notification delay or notification failure. For example, through history data analysis, it is observed that severe notification delay or notification failure tend to happen when the memory usage rate of the notification server 50 is higher than 80%. Or, high correlation is found to exist between [severe notification delay or notification failure] and [memory usage rate>80%]. Then the threshold value of the memory usage rate may be determined to be 80% or lower.

If all parameters are found to be less than or equal to their corresponding threshold values, the flow goes to step S506. In that case, it is determined that the notification server 50 is not overburdened and has capacity for further processes, and notification requests for a subgroup of viewers with the second (or next) highest priority level are transmitted from the backend server 30 to the notification server 50 for subsequent notification processes.

If one or more parameters are found to be higher than their corresponding threshold values, the flow goes to step S512.

In step S512, the backend server 30 stops (or halts) transmitting notification requests to the notification server 50 for a predetermined time period. After the halt, the flow goes to step S608 for subsequent parameter monitoring. In some embodiments, the halt may let the monitored parameters drop below the threshold values. That is, the halt may help alleviate the burden of the notification server 50, and let the notification server 50 return to a healthy status that is not overburdened.

FIG. 7 shows an exemplary data structure of the viewer table 304 in FIG. 4. Information such as IP addresses and corresponding notification servers of the related viewers are stored in the viewer table.

FIG. 8 shows an exemplary data structure of the contribution table 306 in FIG. 4. Contribution information received from the contribution database 37 is stored in the contribution table.

FIG. 9 shows an exemplary data structure of the priority table 308 in FIG. 4. Viewers are classified into different priority levels according to their contribution scores. Each priority level contains N viewers. For example, priority level 1 corresponds to the viewers whose contribution scores are among the top N rankings.

In some embodiments, each priority level could correspond to only one viewer. In some embodiments, N could be determined according to the health or capacity status of the backend server or the notification server. For example, if the health or capacity status of the backend server or the notification server is in good condition, N can be determined to be greater such that a greater number of notification requests can be transmitted from the backend server to the notification server at once. For example, if the health or capacity status of the backend server or the notification server is in poor condition, N can be determined to be fewer such that a fewer number of notification requests can be transmitted from the backend server to the notification server at once. That could increase the granularity of notifications and improve the reliability.

FIG. 10 shows an exemplary data structure of a priority table in accordance with some embodiments of the present disclosure.

In this embodiment, contribution information of streamers are also determined and utilized. A streamer would be classified as a high contributor if the streamer has a probability of contributing more revenue to the live streaming platform, according to the streamer's past record. A streamer would be classified as a low contributor if the streamer has a probability of contributing less revenue to the live streaming platform, according to the streamer's past record.

As shown in FIG. 10, correlation or cross-effect between streamers and viewers are considered in determining the notification priority level for the viewers. The combination of high-contribution viewer and high-contribution streamer leads to the high notification priority. For example, viewers Va, Vc and Vd are high-contribution (contribution level 1) viewers and are eligible notification receivers of the live streaming program distributed by high-contribution streamer A. Therefore, viewers Va, Vc and Vd are classified as priority 1 (highest priority) regarding the notification of streamer A's live streaming program. For example, viewers Vk and Vl are lower-contribution (contribution level 3) viewers and are eligible notification receivers of the live streaming program distributed by middle-contribution streamer B. Therefore, viewers Vk and Vl are classified as priority 8 regarding the notification of streamer B's live streaming program.

FIG. 11 shows an exemplary data structure of a priority table in accordance with some embodiments of the present disclosure.

In this embodiment, contributions of streamers are given a heavier weight in determining the notification priority level. Therefore, notifications regarding streamer A's live streaming program would have higher priority than notifications regarding streamer B's live streaming program.

In some embodiments, a viewer Va is a follower of both streamer A and streamer B, and viewer Va's contribution score with respect to streamer A is higher than viewer Va's contribution score with respect to streamer B. When streamer A and streamer B both start to distribute live streaming programs, the notification request (for notifying viewer Va) about streamer A's live streaming program may be given a higher priority than the notification request (for notifying viewer Va) about streamer B's live streaming program.

In FIG. 3, there is only one streamer A shown in the sequence chart. In some embodiments, there are more than one streamers sending requests to the backend server 30 to start live streaming programs. In that case, the related viewers are users that are determined to be eligible for receiving the notifications about those live streaming programs. In some embodiments, the related viewers include followers of the streamers. In some embodiments, the related viewers include viewers that share the same or similar attributes/tags as one or more of the streamers or the live streaming programs.

Figure 12:
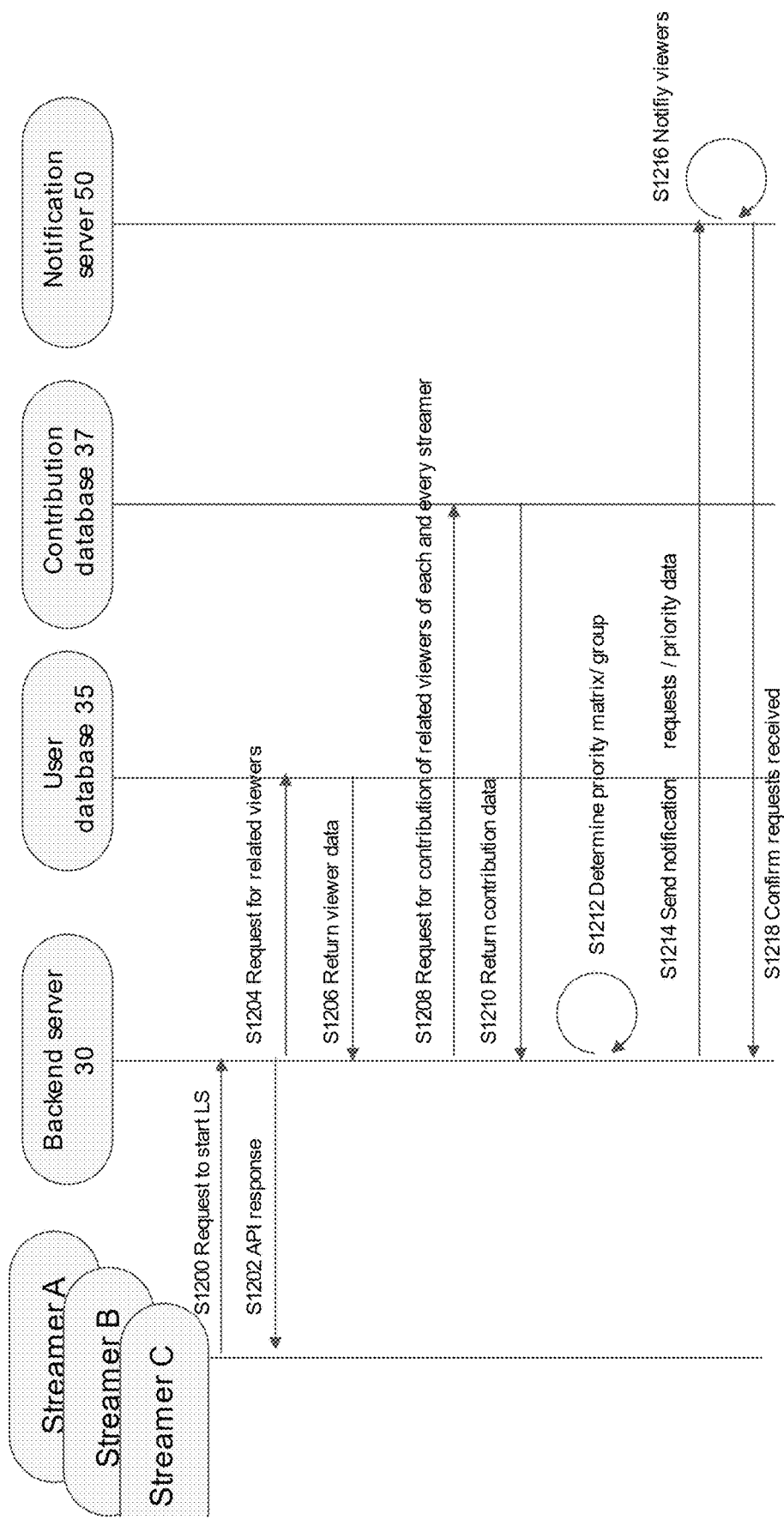
FIG. 12 shows an exemplary sequence chart illustrating a notification process for a live streaming service according to some embodiments of the present disclosure.

FIG. 12 shows an exemplary sequence chart illustrating a notification process for a live streaming service according to some embodiments of the present disclosure. There are plural streamers A, B and C.

In step S1200, streamers A, B and C make requests to the backend server 30 to start live streaming programs.

In step S1202, the backend server 30 transmits API responses to streamers A, B and C to confirm the receipt of the live streaming requests. In some embodiments, the API responses may include metadata related to the live streaming programs.

In step S1204, the backend server 30 transmits a request for related viewers to the user database 35. The related viewers are users that are determined to be eligible for receiving the notifications about the live streaming programs. In some embodiments, the related viewers include followers of streamers A, B and C. In some embodiments, the related viewers include viewers that share the same or similar attributes/tags as streamers A, B and C or their live streaming programs.

In step S1206, the user database 35 transmits information of the related viewers to the backend server 30. In some embodiments, a machine learning model, implemented within or outside the user database 35, is utilized to determine the eligible viewers based on attributes of accessible users and attributes of streamers A, B and C (or tags of their live streaming programs).

In step 1208, the backend server 30 transmits a request for contribution scores of the related viewers to a contribution database 37. The contribution data may include contribution scores of the related viewers with respect to each and every streamer. In some embodiments, the backend server 30 also requests for contribution scores of the streamers.

In step S1210, the contribution database 37 transmits the contribution scores of the related viewers to the backend server 30. In some embodiments, the contribution database 37 also transmits the contribution scores of the streamers to the backend server 30.

In step S1212, the backend server 30 determines a priority level (or notification priority level) for each of the related viewers according to the viewer's contribution score. In some embodiments, a priority level is determined for each pair of viewer and streamer. In some embodiments, a streamer's contribution is also considered in the priority determination. In some embodiments, the determined priority data may have a matrix form similar to the data structures in FIG. 10 and FIG. 11.

In step S1214, the backend server 30 transmits notification requests and/or the priority data to a notification server 50. In some embodiments, a notification request corresponding to a higher priority level may be transmitted earlier than a notification request corresponding to a lower priority level. In some embodiments, a notification request corresponding to a higher priority level may be transmitted with a more reliable channel.

In step S1216, the notification server 50 notifies the related viewers about the live streaming program according to the information received in step S1214. The notification server 50 notifies the related viewers about the live streaming program in an order corresponding to the priority levels of the related viewers (or priority levels of the viewer-streamer pairs).

In step S1218, the notification server 50 transmits confirmation of receiving the notification requests to the backend server 30. Step S1218 may occur before, after, or concurrently with step S1216. In some embodiments, the notification server 50 transmits confirmation of completing the notification tasks to the backend server 30 after step S1216 is done.

In some embodiments, the contribution score of a viewer may be determined according to event information. For example, the backend server may receive event information of a live streaming program, and transmits the event information to a contribution database or a contribution determining unit when requesting for contribution scores. A viewer may be given a higher contribution score with respect to a live streaming program if the viewer's past behavior suggests a correlation between higher contribution probability and the event related to the live streaming program.

In some embodiments, the contribution score of a viewer may be determined according to another viewer. The contribution score of a viewer may be correlated with behavior or existence of another viewer. For example, data analysis has shown that viewer Va has a positive impact on viewer Vc's contribution, and viewer Vb has a negative impact on viewer Vc's contribution. (For example, viewer Va may interact well with viewer Vc to encourage viewer Vc to send more gifts, but viewer Vb tends to bully or interrupt viewer Vc). In that case, the contribution score of viewer Vc may be determined to be higher if the related viewers include viewer Va, and the contribution score of viewer Vc may be determined to be lower if the related viewers include viewer Vb. In some embodiments, if a viewer is determined to have a negative impact on other viewers' contribution or user experience, the notification request corresponding to that viewer may not be transmitted from the backend server to the notification server.

FIG. 13 shows an exemplary data structure of the parameter threshold table 310 in FIG. 4. As shown in FIG. 13, threshold values of the monitored parameters are determined and stored in the parameter threshold table. In this embodiment, the threshold value of the CPU usage rate is set to 70%, the threshold value of the memory usage rate is set to 75%, the threshold value of the bandwidth usage rate is set to 80%, and the threshold value of the QPS is set to 10K.

The present disclosure discloses improved methods and systems for notifying viewers about live streaming programs. Therefore a more reliable notification can be achieved, which may further improve the operation of a live streaming platform.

The processing and procedures described in the present disclosure may be realized by software, hardware, or any combination of these in addition to what was explicitly described. For example, the processing and procedures described in the specification may be realized by implementing a logic corresponding to the processing and procedures in a medium such as an integrated circuit, a volatile memory, a non-volatile memory, a non-transitory computer-readable medium and a magnetic disk. Further, the processing and procedures described in the specification can be implemented as a computer program corresponding to the processing and procedures, and can be executed by various kinds of computers.

Furthermore, the system or method described in the above embodiments may be integrated into programs stored in a computer-readable non-transitory medium such as a solid state memory device, an optical disk storage device, or a magnetic disk storage device. Alternatively, the programs may be downloaded from a server via the Internet and be executed by processors.

Although technical content and features of the present invention are described above, a person having common knowledge in the technical field of the present invention may still make many variations and modifications without disobeying the teaching and disclosure of the present invention. Therefore, the scope of the present invention is not limited to the embodiments that are already disclosed, but includes another variation and modification that do not disobey the present invention, and is the scope covered by the patent application scope.

LIST OF REFERENCE NUMBERS

1 Communication system
10 User terminal
30 Backend server
40 Streaming server
50 Notification server
90 Network
30 Server
35 User database
37 Contribution database
370 Contribution determining unit
300 Priority determining unit
302 Parameter monitoring unit
304 Viewer table
306 Contribution table
308 Priority table
310 Parameter threshold table
S100, S102, S104, S106, S108, S110, S112 Step
S300, S302, S304, S306, S308, S310, S312, S314, S316, S318 Step
S500, S502, S504, S506, S508, S510, S512 Step
S608, S610 Step
S1200, S1202, S1204, S1206, S1208 Step
S1210, S1212, S1214, S1216, S1218 Step
Va, Vb, Vc, Vd, Ve, Vf, Vg, Vh, Vi, Vj, Vk, Vl, Vm Viewer
V1, V2, V3, V4, V5, V6, V7, V8, V9 Viewer
NS1 Notification server

What is claimed is:

1. A method for notification executed by a backend server, the backend server providing a plurality of live streaming programs and included in a communication system, the plurality of live streaming programs including at least one first live streaming programs distributed by a first distributor and at least one second live streaming programs distributed by a second distributor, the at least one first live streaming programs including a former first live streaming program and a current first live streaming program, the former first live streaming program being distributed prior to the current first live streaming program, the method comprising:
- obtaining a list of users related to the current first live streaming program;
- determining a first contribution score of a first user in the list of users with respect to the first distributor, the first contribution score being determined according to a behavior of the first user performed with respect to the former first live streaming program provided by the backend server during live streaming of the former first live streaming program, the first contribution score being a numerical value; and
- transmitting, to a notification server included in the communication system, a first notification request for notifying the first user about the current first live streaming program according to the first contribution score.

2. The method according to claim 1, further comprising:
- determining a second contribution score of a second user in the list of users with respect to the first distributor the second contribution score being determined according to a behavior of the second user;
- determining the first contribution score to be higher than the second contribution score; and
- transmitting, to the notification server, a second notification request for notifying the second user about the current first live streaming program according to the second contribution score;
- wherein the first notification request is transmitted with a higher priority than the second notification request.

3. The method according to claim 2, wherein the first notification request is transmitted earlier than the second notification request.

4. The method according to claim 2, further comprising:
- obtaining a parameter of the backend server;
- determining the parameter to be less than or equal to a predetermined threshold; and
- the transmitting, to the notification server, the second notification request for notifying the second user about the current first live streaming program according to the second contribution score is performed without a delay,
- wherein the parameter identifies a current load of the backend server.

5. The method according to claim 2, further comprising:
- obtaining a parameter of the notification server;
- determining the parameter to be less than or equal to a predetermined threshold; and
- the transmitting, to the notification server, the second notification request for notifying the second user about the current first live streaming program according to the second contribution score is performed without a delay,
- wherein the parameter identifies a current load of the notification server.

6. The method according to claim 1, further comprising:
- obtaining a second contribution score of a second user in the list of users with respect to the first distributor;
- determining the first contribution score to be higher than the second contribution score;
- obtaining a parameter of the backend server;
- determining the parameter to be greater than a predetermined threshold; and
- determining not to transmit a second notification request, to the notification server, for notifying the second user about the current first live streaming program according to the second contribution score for a predetermined time period;
- wherein the second contribution score is a numerical value that is determined according to a behavior of the second user, and the parameter identifies a current load of the backend server, wherein positive behavior of the second user can increase the second contribution score while negative behavior of the second user can decrease the second contribution score.

7. The method according to claim 1, wherein the first contribution score is determined according to the first user's commenting behavior, gift sending behavior, purchasing behavior, viewing behavior, logging-in behavior, or interacting behavior on a platform providing the current first live streaming program.

8. The method according to claim 1, wherein the first contribution score is correlated with a behavior of a second user.

9. The method according to claim 1, further comprising:
- obtaining a distributor contribution score of the first distributor of the at least one first live streaming programs;
- determining a notification priority level for the first user according to the first contribution score and the distributor contribution score; and
- transmitting, to the notification server included in the communication system, the first notification request for notifying the first user about the current first live streaming program according to the notification priority level.

10. The method according to claim 1, wherein the at least one second live streaming programs including a former second live streaming program and a current second live streaming program, the former second live streaming program being distributed prior to the current second live streaming program, the method further comprising:
- determining a third contribution score of the first user with respect to the second distributor, the third contribution score being determined according to another behavior of the first user performed with respect to the former second live streaming grogram provided by the backend server during live streaming of the former second live streaming program, the third contribution score being a numerical value; and
- transmitting, to the notification server, a third notification request for notifying the first user about the current second live streaming program according to the third contribution score.

11. The method according to claim 10, wherein the first notification request is transmitted with a higher priority than the third notification request.

12. A non-transitory computer-readable medium including a program for notification of a live streaming program, wherein the program causes one or a plurality of computers to execute:
- obtaining a list of users related to the live streaming program;
- determining a distributor contribution score of a distributor of the live streaming program according to past revenue record of the distributor;
- determining a notification priority level for a first user in the list of users according to the distributor contribution score; and
- transmitting, to a notification server included in a communication system, a first notification request for notifying the first user about the live streaming program according to the notification priority level, and wherein the one or a plurality of computers are included in a backend server, the backend server providing the live streaming program and included in the communication system.

13. The method according to claim 12, further comprising:

determining a first contribution score of the first user in the list of users according to a behavior of the first user performed with respect to a former live streaming program provided by the backend server during live streaming of the former live streaming program, the first contribution score being a numerical value, the behavior of the first user including gift sending behavior or purchasing behavior by the first user; and determining the notification priority level for the first user according to the first contribution score and the distributor contribution score.

14. A backend server for notification of a live streaming program, the backend server providing the live streaming program and included in a communication system and comprising one or a plurality of processors, wherein the one or plurality of processors execute a machine-readable instruction to perform:

obtaining a list of users related to the live streaming program;

determining a first contribution score of a first user in the list of users according to a behavior of the first user performed with respect to a former live streaming program provided by the backend server during live streaming of the former live streaming program, the first contribution score being a numerical value, the behavior of the first user including gift sending behavior or purchasing behavior by the first user; and transmitting, to a notification server included in the communication system, a first notification request for notifying the first user about the live streaming program according to the first contribution score.

* * * * *